United States Patent
Zhang

(10) Patent No.: US 12,139,003 B2
(45) Date of Patent: Nov. 12, 2024

(54) BATTERY PACK AND ELECTRIC VEHICLE

(71) Applicant: SHANGHAI DIANBA NEW ENERGY TECHNOLOGY CO., LTD., Shanghai (CN)

(72) Inventor: Jianping Zhang, Shanghai (CN)

(73) Assignee: SHANGHAI DIANBA NEW ENERGY TECHNOLOGY CO., LTD., Shanghai (CN)

( * ) Notice: Subject to any disclaimer, the term of this patent is extended or adjusted under 35 U.S.C. 154(b) by 31 days.

(21) Appl. No.: 17/739,546

(22) Filed: May 9, 2022

(65) Prior Publication Data

US 2022/0258589 A1 Aug. 18, 2022

Related U.S. Application Data

(62) Division of application No. 16/462,828, filed as application No. PCT/CN2017/111994 on Nov. 21, 2017, now Pat. No. 11,364,781.

(30) Foreign Application Priority Data

Nov. 21, 2016 (CN) .......................... 201611041220.4

(51) Int. Cl.
*B60K 1/04* (2019.01)
*B60L 50/64* (2019.01)
*H01M 50/249* (2021.01)
*H01M 50/264* (2021.01)

(52) U.S. Cl.
CPC ................ *B60K 1/04* (2013.01); *B60L 50/64* (2019.02); *H01M 50/249* (2021.01); *H01M 50/264* (2021.01); *B60K 2001/0455* (2013.01); *B60Y 2200/91* (2013.01); *H01M 2220/20* (2013.01)

(58) Field of Classification Search
CPC .... B60K 1/04; B60K 1/00; B60K 2001/0455; B60K 2001/0472; B60K 2001/0405; H01M 50/20; H01M 50/202; H01M 50/204; H01M 50/244; H01M 50/249; H01M 2220/20; B60Y 2200/91; B60Y 2200/90; B60Y 2200/92
See application file for complete search history.

(56) References Cited

U.S. PATENT DOCUMENTS

| | | | | |
|---|---|---|---|---|
| 3,799,063 | A * | 3/1974 | Reed ....................... | B60L 50/66 104/34 |
| 4,087,895 | A * | 5/1978 | Etienne ................... | B60L 50/66 254/93 HP |
| 4,365,681 | A * | 12/1982 | Singh ..................... | B60L 50/64 180/68.5 |

(Continued)

FOREIGN PATENT DOCUMENTS

CN 105150820 * 12/2015

*Primary Examiner* — James M Dolak
(74) *Attorney, Agent, or Firm* — B. Aaron Schulman, Esq.; Stites & Harbison, PLLC

(57) ABSTRACT

A battery pack and an electric vehicle are provided. A plurality of lock shafts are mounted on an outer side of the battery pack, and each of the lock shafts includes a shaft seat and a shaft rod. The lock shaft is mounted to the outer side of the battery pack by the shaft seat. A concave positioning hole is arranged at an end of the shaft rod away from the shaft seat, and a first positioning steel magnet is mounted in the positioning hole.

8 Claims, 8 Drawing Sheets

(56) References Cited

U.S. PATENT DOCUMENTS

| | | | | |
|---|---|---|---|---|
| 7,201,384 B2* | 4/2007 | Chaney | B60L 53/80 | |
| | | | 280/783 | |
| 8,006,793 B2* | 8/2011 | Heichal | B60K 1/04 | |
| | | | 180/68.5 | |
| 8,164,302 B2* | 4/2012 | Capizzo | B60L 53/62 | |
| | | | 320/109 | |
| 8,256,553 B2* | 9/2012 | De Paschoal | B60G 3/20 | |
| | | | 180/68.5 | |
| 8,511,413 B2* | 8/2013 | Ojima | B60L 50/66 | |
| | | | 180/68.5 | |
| 8,516,687 B2* | 8/2013 | Hozumi | B60K 1/04 | |
| | | | 187/218 | |
| 8,776,926 B2* | 7/2014 | Auer | H01M 50/249 | |
| | | | 180/68.5 | |
| 8,858,152 B1* | 10/2014 | McDaniel | B60L 50/64 | |
| | | | 414/809 | |
| 8,925,983 B2* | 1/2015 | Ohgitani | B60K 1/04 | |
| | | | 292/216 | |
| 9,070,923 B2* | 6/2015 | Yu | B60L 53/80 | |
| 9,216,718 B2* | 12/2015 | Ojima | B60K 1/04 | |
| 9,409,470 B2* | 8/2016 | Trentin | B60K 1/04 | |
| 9,573,453 B2* | 2/2017 | Ojima | B60K 1/04 | |
| 9,630,483 B2* | 4/2017 | Yamada | B60K 1/04 | |
| 9,662,965 B2* | 5/2017 | Poillot | H01M 50/20 | |
| 9,722,223 B1* | 8/2017 | Maguire | B60L 50/64 | |
| 9,758,030 B2* | 9/2017 | Newman | H01M 50/502 | |
| 10,160,344 B2* | 12/2018 | Newman | H01M 10/613 | |
| 10,183,563 B2* | 1/2019 | Rayner | H02J 7/0042 | |
| 10,230,083 B2* | 3/2019 | Maguire | B60L 50/64 | |
| 10,259,332 B2* | 4/2019 | Lin | B64F 1/02 | |
| 10,940,747 B2* | 3/2021 | Bengtsson | H01M 50/264 | |
| 11,588,338 B2* | 2/2023 | Zhang | H01M 50/262 | |
| 11,766,926 B2* | 9/2023 | Ma | H01M 50/233 | |
| | | | 180/68.5 | |
| 11,769,924 B2* | 9/2023 | Nishimura | H01M 50/262 | |
| | | | 429/163 | |
| 11,794,594 B2* | 10/2023 | Faruque | B60K 1/04 | |
| 11,794,595 B2* | 10/2023 | Ragot | B60L 50/66 | |
| 11,912,155 B2* | 2/2024 | Zhang | H01M 50/204 | |
| 11,919,404 B2* | 3/2024 | Selvaraj | B60K 1/04 | |
| 11,926,045 B2* | 3/2024 | Altman | B25J 5/007 | |
| 11,926,226 B2* | 3/2024 | Gim | B62D 25/20 | |
| 11,938,804 B2* | 3/2024 | Andersson | H01M 50/249 | |
| 11,945,295 B2* | 4/2024 | Jaradi | B60R 21/36 | |
| 11,945,316 B2* | 4/2024 | Bender | B60L 50/20 | |
| 11,955,650 B2* | 4/2024 | An | B62D 25/2036 | |
| 11,958,351 B2* | 4/2024 | Zhang | H01M 50/264 | |
| 11,958,379 B2* | 4/2024 | Zhang | B23P 19/10 | |
| 2011/0223459 A1* | 9/2011 | Heichal | B60K 1/04 | |
| | | | 429/100 | |
| 2012/0111654 A1* | 5/2012 | Origuchi | B60L 53/80 | |
| | | | 180/68.5 | |

* cited by examiner

BATTERY PACK AND ELECTRIC VEHICLE

CROSS-REFERENCE TO RELATED APPLICATIONS

This application a divisional application of U.S. patent application Ser. No. 16/462,828, which is a National Stage Application of International Application No. PCT/CN2017/111994 filed on Nov. 21, 2017, which claims priority to and benefits of Chinese Patent Application Serial No. 201611041220.4, titled "Locking Device and Electric Vehicle" and filed on Nov. 21, 2016, the entire contents of all of which are incorporated herein by reference.

FIELD

The present disclosure relates to a technical field of electric vehicles, and more particularly to a battery pack and an electric vehicle.

BACKGROUND

A battery of an existing electric vehicle is generally installed in a fixed way or in a replaceable type. The fixed battery is usually fixed to the vehicle, and the vehicle is directly charged during charging. The replaceable battery is usually installed in a movable manner, and the battery can be removed at any time for replacement or for charging and then be installed to the vehicle body after replacement or charging.

At present, a battery may be replaced by a manual operation or an automatic operation. Either way, the battery is mounted to a chassis of the electric vehicle, and the installed battery needs to be locked to the vehicle body. Due to a relatively large weight of the battery, a structure using multiple locking positions to lock simultaneously is employed, but an existing locking structure fails to meet requirements in terms of speed and automation.

In addition, during a battery change process in the related art, a position of a battery pack cannot be easily determined in time, diminishing the battery change efficiency.

SUMMARY

The present disclosure aims to provide a battery pack and an electric vehicle, to overcome the defect in the related art that the position of the battery pack cannot be easily determined in time.

A battery pack is provided according to an embodiment. A plurality of lock shafts is mounted on an outer side of the battery pack. Each of the lock shafts includes a shaft seat and a shaft rod; the lock shaft is mounted to the outer side of the battery pack by the shaft seat; a concave positioning hole is arranged at an end of the shaft rod away from the shaft seat, and a first positioning steel magnet is mounted in the positioning hole.

An electric vehicle include a battery pack, a fixing seat configured to install the battery pack, and a locking device. A plurality of lock shafts is mounted on an outer side of the battery pack. Each of the lock shafts includes a shaft seat and a shaft rod; the lock shaft is mounted to the outer side of the battery pack by the shaft seat; a concave positioning hole is arranged at an end of the shaft rod away from the shaft seat, and a first positioning steel magnet is mounted in the positioning hole. The fixing seat is mounted to a vehicle body; the locking device is mounted to an inner lateral surface of the fixing seat opposite to the battery pack; and the locking device includes a lock base configured to provide a locking position, the lock base including a lock body having a surface provided with a lock groove recessed towards the inside of the lock body, and a lock shaft being inserted into the lock groove to perform locking.

DETAILED DESCRIPTION

Figure 1:
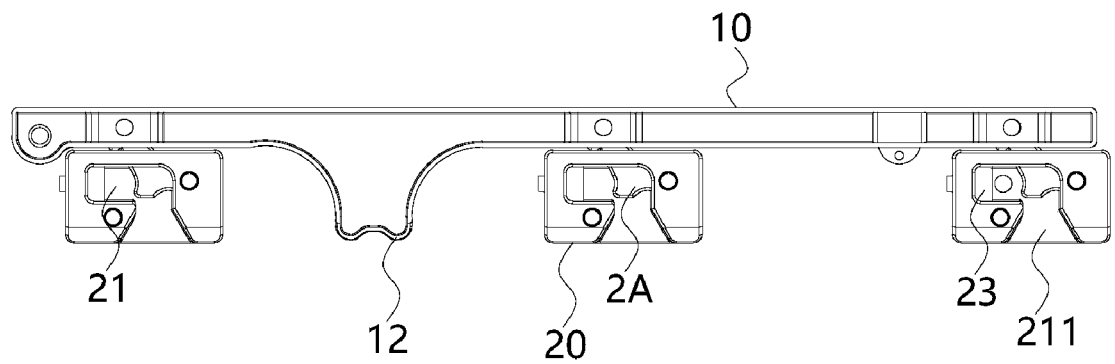
FIG. 1 illustrates a schematic view of a locking device according to an embodiment of the present disclosure.

As shown in FIGS. 1-6, a locking device of an embodiment of the present disclosure generally includes a lock base 20 configured to provide a locking position, a lock shaft 30 configured to be inserted into the lock base 20, and a lock connecting rod 10 configured to unlock the lock shaft 30 after being inserted.

The lock base 20 includes a lock body 25 having a rectangular shape. A front surface of the lock body 25 is provided with a lock groove 21 recessed towards the inside of the lock body 25. The lock base 20 further includes a lock tongue groove 22 and a lock tongue 24 mounted in the lock tongue groove 22. The lock tongue groove 22 is communicated with the lock groove 21, and the lock tongue 24 is movably mounted in the lock tongue groove 22.

The lock shaft 30 includes a shaft seat 34 having a fixing hole, and a shaft rod 31 perpendicularly arranged to a surface of the shaft seat 34 and configured to be inserted into the lock groove 21 of the lock base 20 so as to perform locking.

The lock connecting rod 10 may include an elongated rod member 11 movably connected to the lock tongue 24 of the lock base 20.

Figure 2:
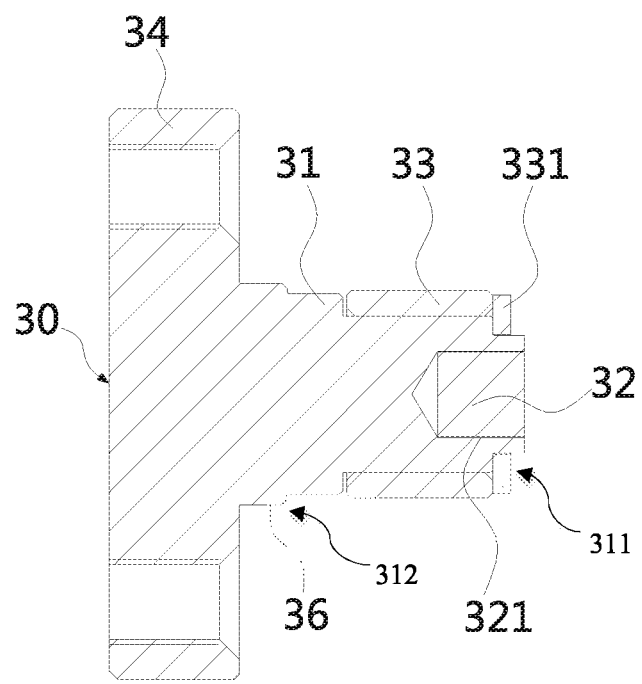
FIG. 2 illustrates a sectional view of a lock shaft along an axis according to an embodiment of the present disclosure.
Figure 3:
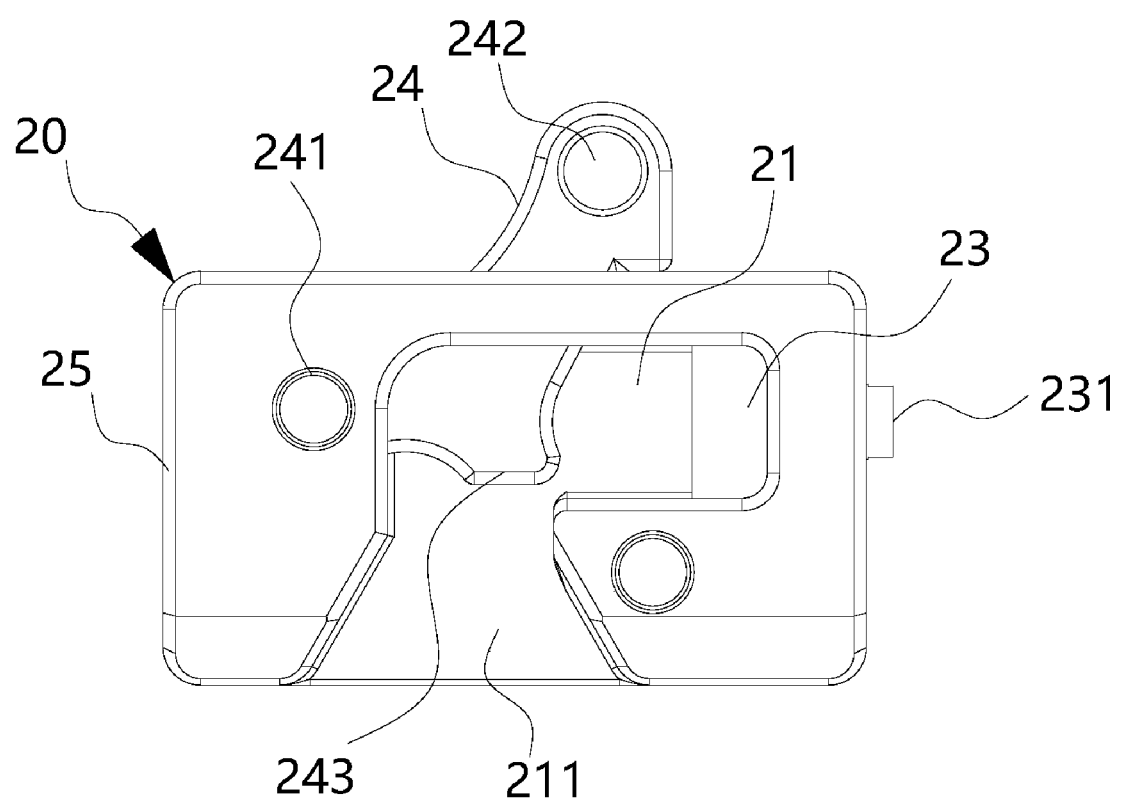
FIG. 3 illustrates a schematic view of a lock base according to an embodiment of the present disclosure.
Figure 4:
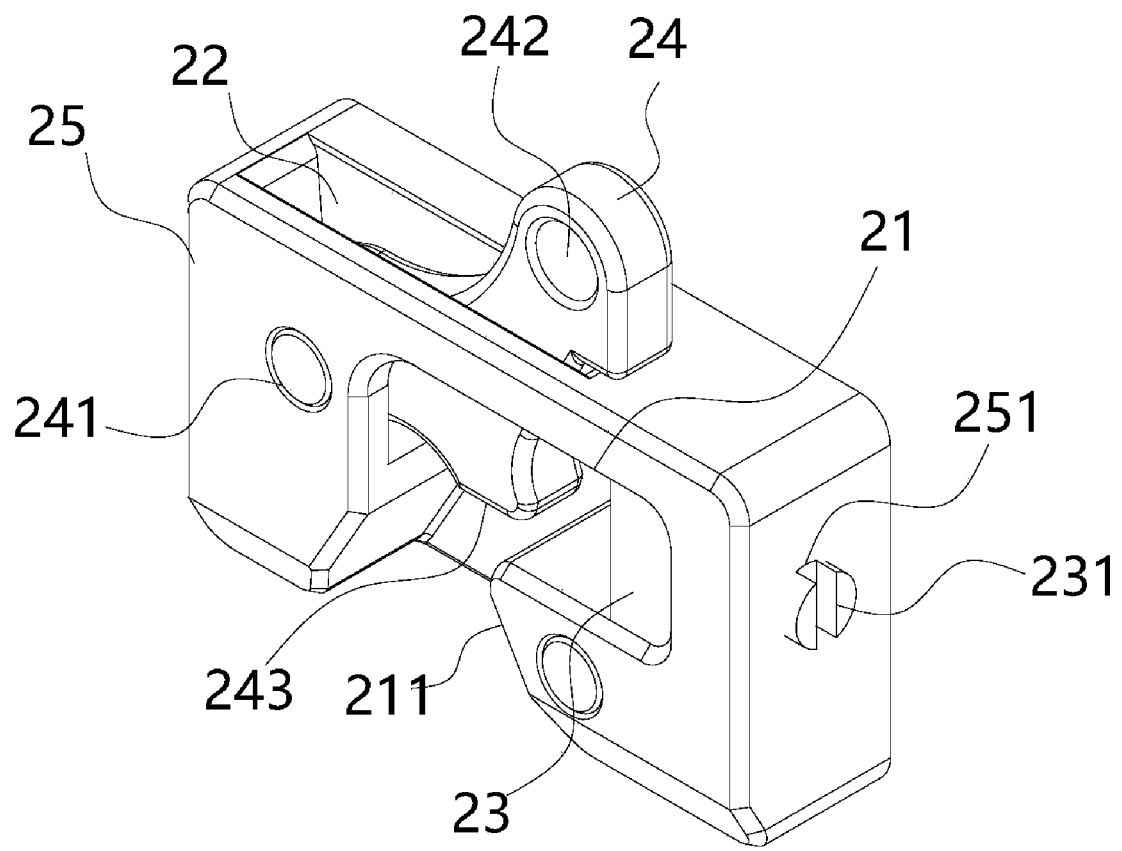
FIG. 4 is a perspective view of FIG. 3.
Figure 11:
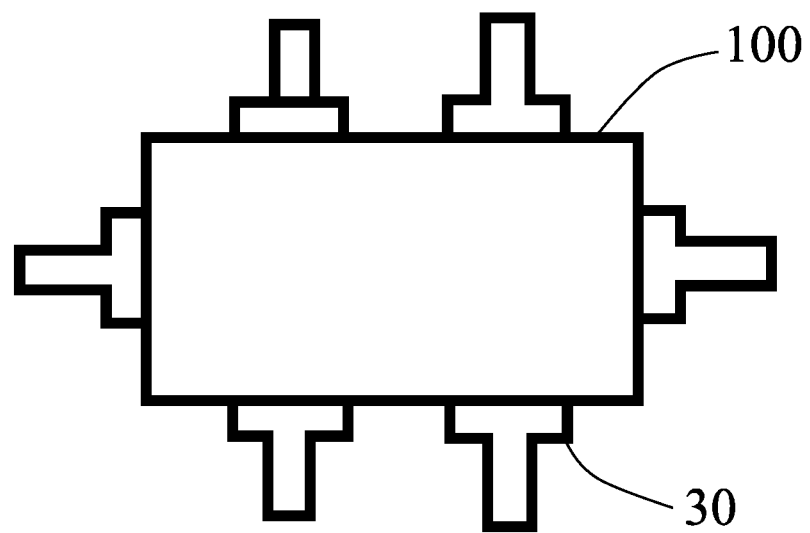
FIG. 11 illustrates a schematic view of a battery pack with a plurality of lock shafts mounted on its outer side.

The locking device in the embodiment can be used to lock a power battery of an electric vehicle, in which the lock shafts 30 are mounted around a battery pack 100 (as shown in FIG. 11), and the lock bases 20 and the lock connecting rod 10 are mounted to an inner lateral surface of a vehicle body fixing seat for fixing the battery and arranged at positions corresponding to the positions of the lock shafts 30. As shown in FIGS. 2 and 3, in an embodiment of the present disclosure, the lock groove 21 has a certain length in the horizontal direction, and the lock groove 21 has a side provided with an opening 211 communicated with a bottom surface of the lock body 25 and leading to the outside of the lock body, in which the opening 211 is used for the lock shaft 30 mounted on the battery to enter. The lock tongue groove 22 has an opening which leads to a top surface of the lock body, and the lock tongue passes through this opening to be movably connected with the lock connecting rod 10. A side of the lock tongue adjacent to the lock groove 21 is provided with a stopping device 2A, and the stopping device 2A is configured to close the opening 211 of the lock groove 21.

The lock body 25 has a back surface fixedly fixed to the vehicle body fixing seat, and a front surface facing the battery to be installed. The lock connecting rod 10 is movably mounted above the lock base 20 through the lock tongue. The lock shaft 30 is mounted on an outer side of the battery pack 100 by the shaft seat at a position corresponding to the lock base 20.

When in use, the battery enters the fixing seat from the bottom of the electric vehicle under a lifting action of a battery-changing mobile platform, and a unlocking member pushes the lock connecting rod 10 to move upwards and drives the lock tongue to open the opening 211 of the lock groove 21, such that the lock shaft 30 around the battery is inserted into the lock groove 21 through the opening 211 of the lock groove 21 of the corresponding lock base 20 by means of the shaft rod 31, and then is moved to the other side of the lock groove 21 under the push of the battery-changing mobile platform until the lock shaft comes into contact with the other end of the lock groove. In such a way, a suspension process of the battery is completed. During the insertion of the shaft rod 31, the lock connecting rod 10 drives the stopping device 2A to move upwardly, under the push of the unlocking member, and when the shaft rod 31 enters a locking region in the lock groove 21 beyond the position of the stopping device 2A, the stopping device 2A falls under the gravity of the lock connecting rod 10 to laterally block a return path of the shaft rod 31. At this time, the battery is in a state of being completely locked to the electric vehicle. When the battery needs to be replaced, an unlocking device on the battery-changing mobile platform contacts the lock connecting rod 10 and pushes the lock connecting rod 10 to rise, so that the lock tongue leaves the lock groove 21, and at this time, the battery is moved to cause the shaft rod 31 to be withdrawn from the lock groove 21, thereby completing a battery removal process.

Figure 5:
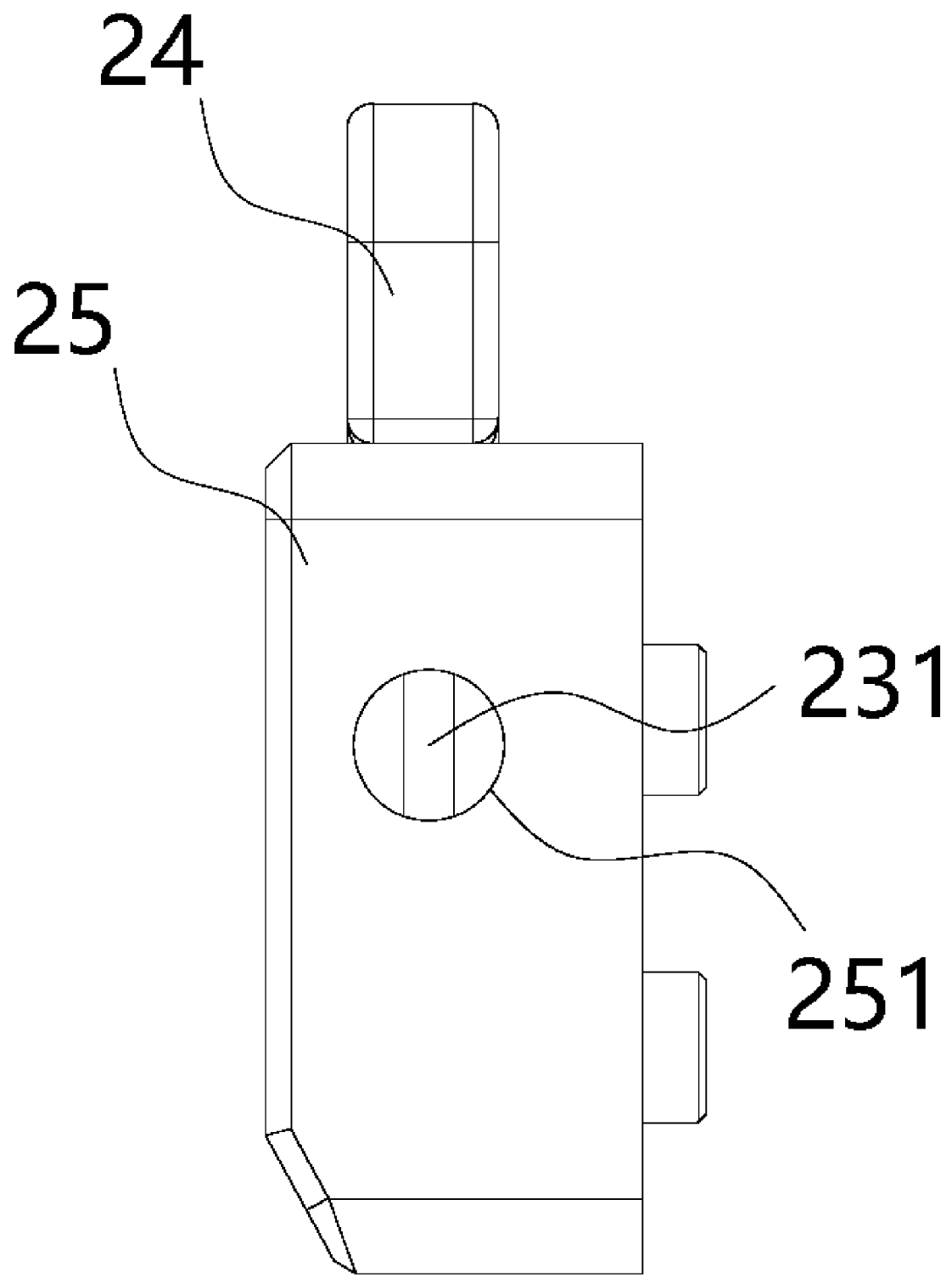
FIG. 5 is a right view of FIG. 4.

As shown in FIG. 5, in an embodiment of the present disclosure, an elastic pad 23 is mounted on the other end of the lock groove 21 away from the opening 211, and an elastic pad mounting hole 251 is provided in a side wall of the other end. The elastic pad 23 may be installed in the elastic pad mounting hole 251 through a pillar 231 on a surface of the elastic pad. By providing the elastic pad 23 at the other end of the lock groove, after the lock shaft is inserted into the lock groove 21, the friction between the lock shaft 30 and the lock groove 21 can be reduced to protect the lock shaft 30. This structure facilitates the installation and removal of the elastic pad 23. The pillar 231 may adopt a tensioning structure with an opening, and after being inserted into the elastic pad mounting hole 251, the protrusion may be automatically clamped to prevent an unintentional escape of the elastic pad 23. The elastic pad 23 may be specifically made of an organic material such as rubber or plastic, so as to have certain stiffness and meanwhile avoid causing hard damage to the lock shaft 30.

In an embodiment of the present disclosure, the lock groove 21 may adopt an L-shaped structure, which can provide the battery with a stable suspension platform, and at the same time, the elastic pad 23 is arranged at the end of the lock groove 21, which can reduce the collision between the battery and the fixing seat during the installation and during driving, thereby improving the service life of various locking components. In other embodiments, the lock groove 21 may also adopt a curved shape or other shapes capable of providing the suspension platform.

In an embodiment of the present disclosure, the stopping device 2A may be specifically configured as a stop block 243 protruding from the lock tongue 24 towards a side of the lock groove 21, and the stop block 243 is used to close the opening 211 of the lock groove 21 to prevent the shaft rod 31 inserted into the lock groove 21 from sliding out of the lock groove 21. The lock tongue 24 is connected in the lock tongue groove 22 through a shaft, and the lock tongue 24 includes a lock tongue groove shaft hole 241 connected to the lock tongue groove 22, and a lock connecting rod shaft hole 242 connected to the lock connecting rod 10 which pushes the lock tongue 24 to rotate.

The lock tongue 24 in a normal state is simultaneously connected to the lock base 20 and the lock connecting rod 10 through shafts. Since the lock connecting rod 10 is in an active state, the lock tongue 24 can be rotated about a shaft connection point with the lock base 20 by the movement of the lock connecting rod 10, so that the stop block 243 of the lock tongue 24 can be switched between a state of entering the lock groove 21 and a state of leaving the lock groove 21. The lock connecting rod 10 is pushed to move upwards by the external unlocking device, such that the lock tongue is moved upwards, and the stop block 243 leaves the lock groove 21. The shaft rod 31 of the lock shaft 30 enters the lock groove 21 from the opening 211, and is translated into the locking region of the lock groove 21 under the push of the battery-changing platform. At this time, the unlocking device is removed, the lock connecting rod 10 moves downwards by gravity, the lock tongue is also moved downwards, and the stop block 243 blocks the opening 211 of the lock groove 21, such that the shaft rod is locked in the lock groove 21, and the corresponding battery is also stably fixed in the fixing seat of the electric vehicle.

During the battery replacement, the unlocking device on the battery-changing mobile platform pushes the lock connecting rod 10 upwardly in an upward lifting process, and the movement of the lock connecting rod 10 naturally drives the stop block 243 of the lock tongue 24 to leave the lock groove 21. At this time, the battery can be moved to remove the lock shaft 30 from the opening 211 of the lock groove 21, thereby completing the unlocking of the battery.

In an embodiment of the present disclosure, a diameter of a first end of the opening 211 at the bottom surface may be larger than a diameter of a second end of the opening 211 at the lock groove 21. The use of such an open structure facilitates the entry of the lock shaft 30 and also reduces the collision damage to the lock base 20.

In an embodiment of the present disclosure, the bottom surface of the lock body 25 and the front surface of the lock body 25 may be connected through tangent surfaces. This structure can reduce the collision with the lock base 20 in a rising process of the battery.

In an embodiment of the present disclosure, the back surface of the lock body 25 is provided with a lock shaft sensing hole in communication with the lock groove 21. A sensing device may be installed at a position of the fixing seat corresponding to the lock shaft sensing hole. When the lock shaft 30 enters the lock groove 21, a first positioning steel magnet 32 mounted thereon is sensed by the sensing device when passing through the lock shaft sensing hole, such that it is determined whether the battery currently enters the lock groove 21 or not, thereby determining the next action.

As shown in FIG. 2, in an embodiment of the present disclosure, a concave positioning hole 321 is provided in an end of the shaft rod 31 away from the shaft seat 34, and the first positioning steel magnet 32 is mounted in the positioning hole 321. A sleeve 33 is fitted over the shaft rod 31 to prevent the first positioning steel magnet 32 from coming off. The shaft seat 34 may have a circular plate-like structure, first fixing holes 35 are provided around a center of the circle, and the shaft seat 34 is fixed to a side edge of the battery. The shaft rod 31 is perpendicularly connected to the center of the shaft seat 34, the concave positioning hole 321 is provided in the end away from the shaft seat 34, and after the shaft seat 34 is fixed to the battery, the shaft rod 31 perpendicularly projects outwards. The first positioning steel magnet 32 is mounted in the positioning hole 321 of the shaft rod 31, and configured to provide sensing information to an external sensing device, so as to indicate the current position of the battery. The sleeve 33 is fitted over an outer circumference of one end of the shaft rod 31 to which the first positioning steel magnet 32 is mounted, and the sleeve 33 and the shaft rod 31 may be in a sliding relationship.

In the present embodiment, a plurality of the lock shafts 30 may be provided, and they are fixed, through the first fixing holes 35 in the shaft seat 34, to a side edge of the battery in contact with the fixing seat of the electric vehicle. The positions of the fixed lock shafts 30 correspond to the positions of the lock bases 20 on the fixing seat. Each of the shaft rods 31 protrudes perpendicularly from the side edge of the battery. When the battery is snapped into the fixing seat of the electric vehicle under the control of the battery-changing mobile platform, the shaft rods 31 of the lock shafts 30 are inserted into the lock grooves 21 of the corresponding lock bases 20, and the friction of the shaft rod 31 in the moving contact with the lock groove 21 can be reduced by the sleeve 33. When the battery-changing mobile platform drives the shaft rod 31 to move in the lock groove 21, the first positioning steel magnet 32 at a front end of the shaft rod 31 passes through the sensing device mounted on the fixing seat, so that the battery-changing mobile platform clearly knows the current installation position of the battery and can make the next action in time.

In the present embodiment, the friction between the lock shaft 30 and the lock base 20 can be reduced, the locking and unlocking processes can be improved, and clear movement state information of the battery can be offered to provide a basis for automatic unlocking and automatic locking.

In an embodiment of the present disclosure, in order to define the position of the sleeve 33, a retaining ring or a retaining flange may be provided at both ends of the shaft rod 31. An outwardly protruding retaining flange 36 is provided at an end (i.e., a second end) 312 of the shaft rod 31 close to the shaft seat 34, and has a diameter larger than a diameter of the shaft rod 31, so that the sleeve 33 can be restricted at a specified position of the shaft rod 31 to achieve better contact with the lock groove 21. The retaining flange 36 may also prevent the shaft seat 34 from rubbing against the lock base 20 and hence avoid causing damage to the corresponding components. Further, a retaining ring 331 may be provided at an end (i.e., first end) 311 of the shaft rod 31 away from the shaft seat 34 and be configured to prevent the sleeve 33 from coming off. The retaining ring 331 may be mounted to the shaft rod 31 by a structure that is snapped in a groove of the shaft rod 31.

Figure 6:
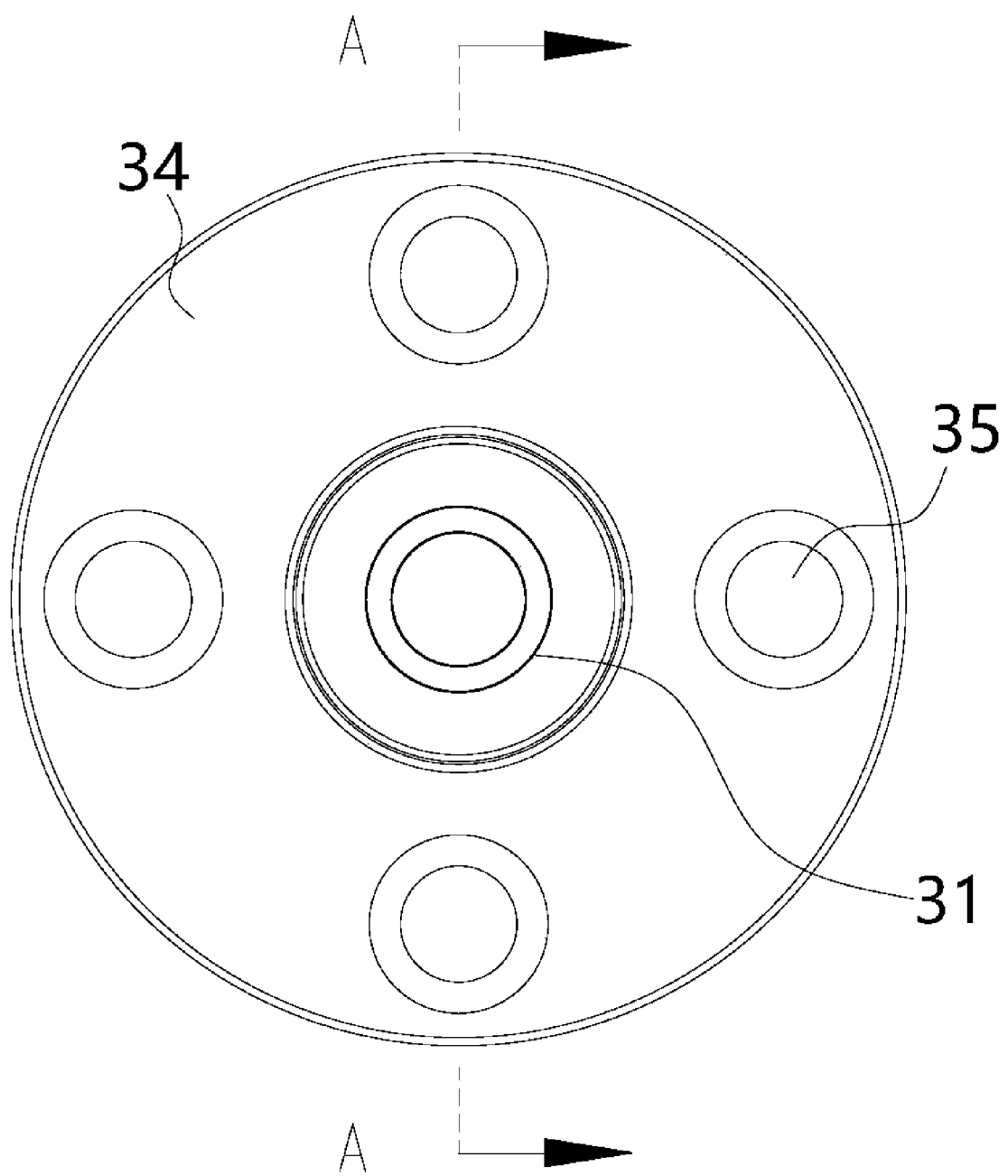
FIG. 6 illustrates a front view of a lock shaft according to an embodiment of the present disclosure.
Figure 7:
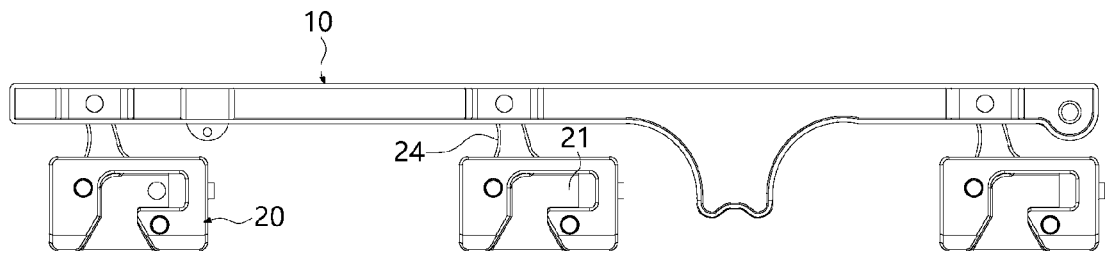
FIG. 7 illustrates a schematic view of a lock connecting rod according to an embodiment of the present disclosure.
Figure 8:
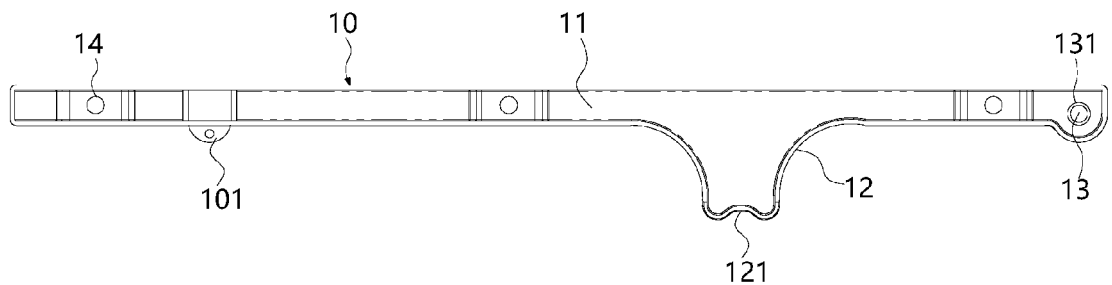
FIG. 8 illustrates a schematic view of a lock connecting rod according to an embodiment of the present disclosure.
Figure 9:
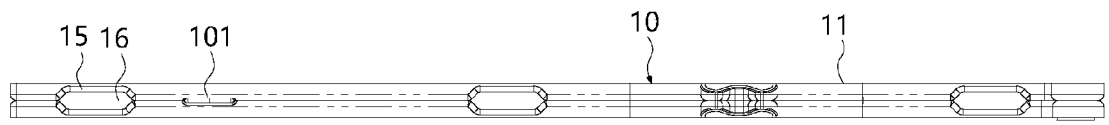
FIG. 9 is a top view of FIG. 8.
Figure 10:
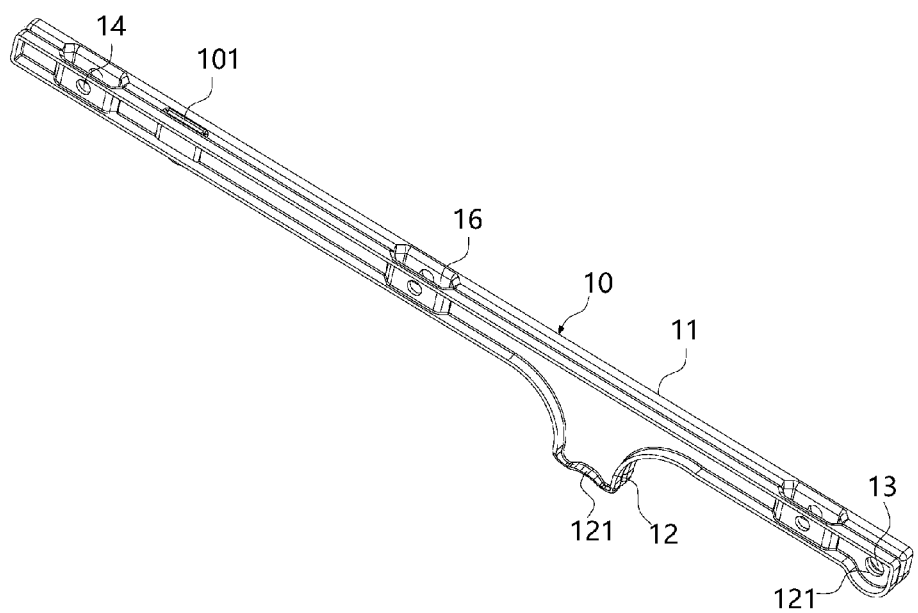
FIG. 10 is a perspective view of FIG. 9.
Figure 12:
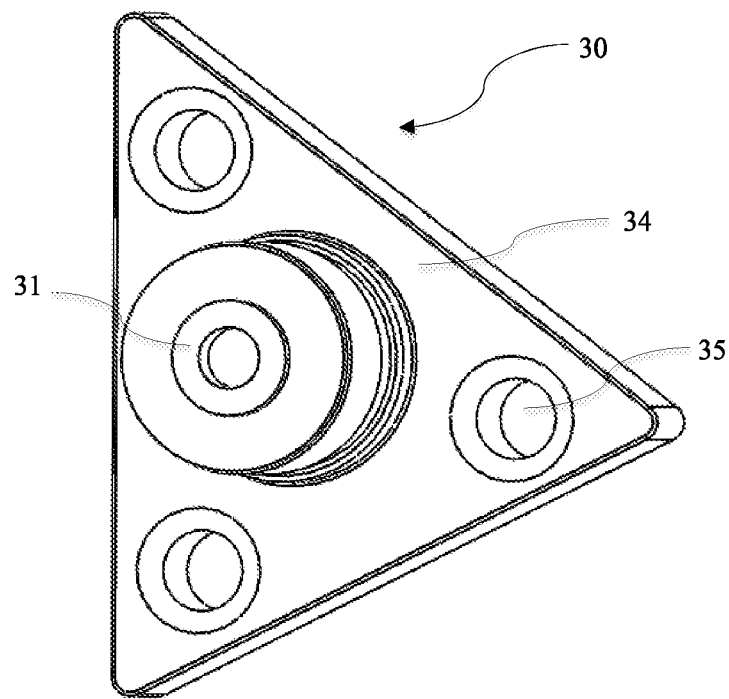
FIG. 12 illustrates a front view of a triangular shaft seat according to an embodiment of the present disclosure.

In order to facilitate the fixation of the lock shaft 30, in an embodiment of the present disclosure, as shown in FIG. 6 and FIG. 12, the shaft seat 34 of the lock shaft 30 may be circular or triangular, and three to four first fixing holes 35 are provided and symmetrically distributed around the center of the shaft seat 34.

Figure 13:
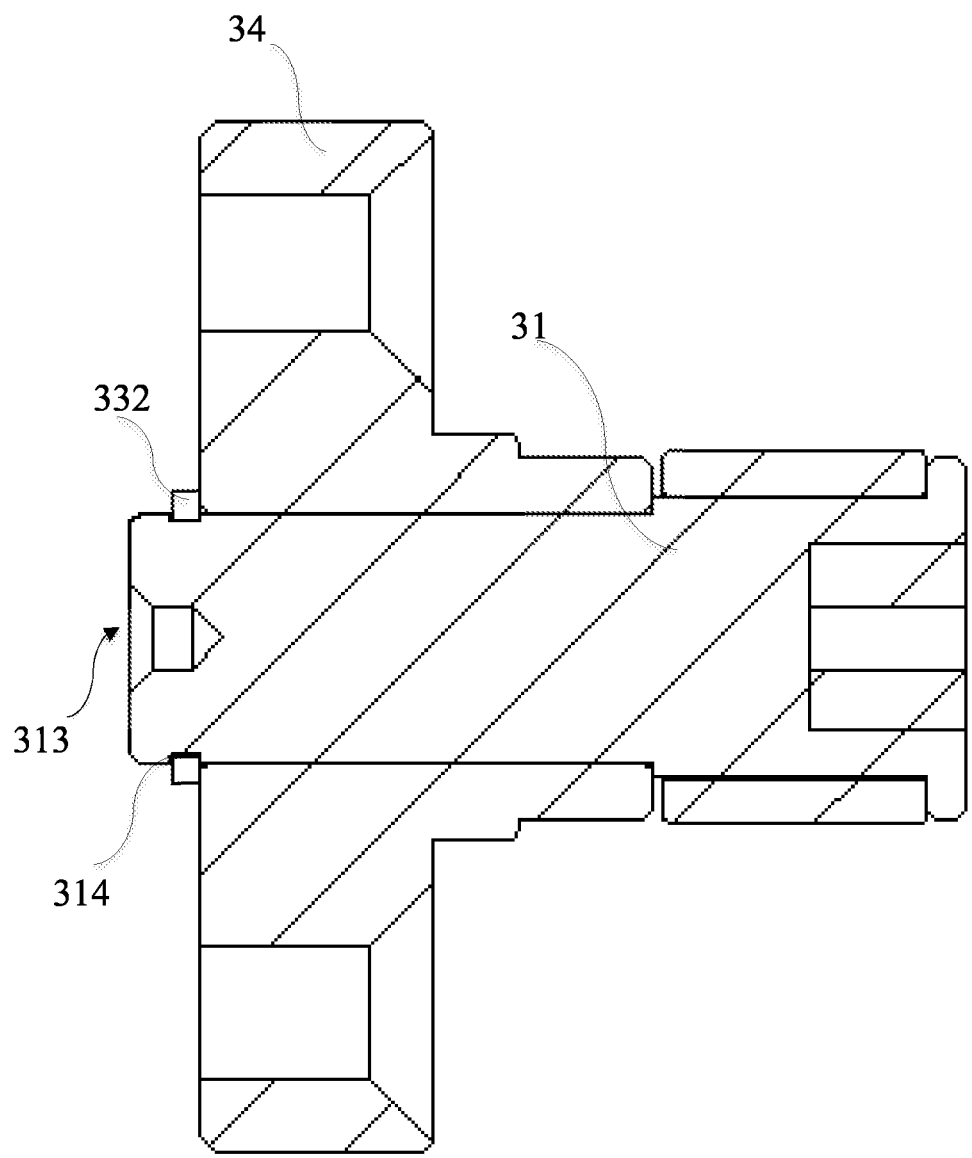
FIG. 13 illustrates a sectional view of a lock shaft along an axis according to an embodiment of the present disclosure.

In an embodiment of the present disclosure, as shown in FIG. 13, a connecting end of the shaft rod 31 with the shaft seat 34 may pass through a shaft hole in the center of the circle and may be exposed from the other end. A snap ring 332 may be provided to the passing end 313 of the shaft rod 31 and snap-fitted in a groove 314 of the shaft rod 31 to prevent the shaft rod 31 from coming off. The snap ring 332 may be mounted in the same way as the aforementioned retaining ring 331. Although the shaft rod 31 and the shaft seat 34 are movably mounted, the shaft rod 31 may be integrally formed with the shaft seat 34 in other embodiments (as shown in FIG. 2).

As shown in FIGS. 7-10, in an embodiment of the present disclosure, the lock connecting rod 10 may specifically include an elongated rod-like member 11, and the lock connecting rod 10 may be movably connected with a plurality of lock bases 20 to be locked through the lock tongues. The lock connecting rod has a length corresponding to the distance among the plurality of lock bases 20 to be locked, and a through hole 16 is provided at a position corresponding to each of the lock bases 20 and configured to be connected with the lock tongue 24 through a shaft. The through hole 16 facilitates the insertion of the lock tongue, and the number of the through holes 16 corresponds to the number of the lock bases. The rod member 11 is further provided with an unlocking block 12 on a side corresponding to the position of the lock base 20, and the unlocking block 12 is used to lift the rod member 11 under the push of the unlocking device of the battery-changing mobile platform, so that the lock connecting rod 10 drives the lock tongue 24 to switch between an unlocking state and a locking state.

When installed, the lock connecting rod 10 is connected with the lock tongue 24 through shaft and hence is located above each lock base 20, and the lock tongue 24 is also connected with the lock base 20 by a shaft, so that the rise and fall of the lock connecting rod 10 can drive the lock tongue 24 to rotate around a shaft connection point in the lock base 20, to realize the switch between the state of being snapped into the lock groove 21 and the state of leaving the lock groove 21. This embodiment employs a single lock connecting rod 10 to simultaneously control the lock tongues 24 of the plurality of lock bases 20, thereby realizing a function of synchronously unlocking and locking the plurality of lock bases 20, so as to improve the unlocking process of the battery and accelerate the battery replacement efficiency.

The rod member 11 of each lock connecting rod 10 may be provided with three through holes 16, and a second fixing hole 14 may be provided in the through hole 16 and configured to be connected with the lock tongue by means of a shaft. Each second fixing hole 14 corresponds to and is connected with the lock tongue 24 of one lock base 20. The second fixing hole 14 runs through the through hole 16 in a manner perpendicular to a lateral surface of the rod member 11.

In an embodiment of the present disclosure, the unlocking block 12 may be an arc protrusion formed outwardly by the rod member 11. The top of the unlocking block 12 is configured as an inner arc groove 121 recessed towards the rod member 11. The use of the arc protrusion prevents the lock connecting rod 10 from being blocked by other components during its movement. At this time, the arc protrusion facilitates contact with the unlocking device of the battery-changing mobile platform, to enable the unlocking device to move the lock connecting rod 10 along the arc protrusion in a transverse direction instead of being stuck in a certain position. The structure of the inner arc groove 121 on the top of the unlocking block 12 can form an optimal unlocking position with the unlocking device, and at this position, the lock connecting rod 10 has been fully unlocked and the retention of the unlocking device is facilitated. The position of the unlocking block 12 may be specifically arranged on the rod member 11 between the two through holes, as long as the movement of the lock connecting rod 10 is not affected.

In an embodiment of the present disclosure, a spring pull tab 101 on the same side of the unlocking block 12 may be fixedly mounted on the rod member 11, and an exposed end of the spring pull tab 101 is provided with a hooking hole. The spring pull tab 101 is used to connect a spring fixed to the fixing seat of the electric vehicle, and the spring applies a pulling force to the lock connecting rod 10 towards the lock base 20 to improve the stability of the lock connecting rod 10 in the locked state.

In an embodiment of the present disclosure, in order to determine the current position of the lock connecting rod 10, a second positioning steel magnet 13 may be mounted on the rod member 11, and the second positioning steel magnet 13 may generate induction with an external magnetic detecting device to determine the current position of the rod member 11 according to a sensing signal.

The second positioning steel magnet 13 may be specifically mounted at an end of the rod member 11 and may be cylindrical; the end of the rod member 11 is provided with a steel magnet mounting hole 131 passing through the rod member 11; and the second positioning steel magnet 13 is inserted in the steel magnet positioning hole 131. A corresponding sensing device is provided on a moving track of the second positioning steel magnet 13. When the rod member 11 is moved, the second positioning steel magnet 13 stays at or passes through the sensing device to determine whether the lock connecting rod 10 is currently in the unlocked state or in the locked state.

The lock shaft according to the present disclosure is provided with the positioning steel magnet which can be sensed by an external sensing device, such that the battery-changing mobile platform can obtain the current installation position of the battery and make the next action in time, improving the battery change efficiency.

The present disclosure can fix the battery to the electric vehicle in such a way that a plurality of lock shafts distributed on a side edge of the battery are simultaneously inserted into a plurality of lock bases of the electric vehicle, and can simultaneously lock the plurality of lock shafts to the lock bases in an automatic manner by means of the action of the lock connecting rod, thereby improving the efficiency of assembling or disassembling the battery greatly.

By adopting the above-mentioned lock groove structure, the lock base of the present disclosure can provide the battery with a balanced suspension platform, and the elastic pad arranged at the end of the lock groove can reduce the collision between the battery and the fixing seat during the installation and during driving, thereby improving the service life of various locking components.

The lock shaft of the present disclosure can reduce the friction with the lock base, improve the locking and unlocking process, and offer clear motion state information to provide a basis for automatic unlocking and automatic locking.

The present disclosure utilizes a single lock connecting rod to simultaneously control the lock tongues of the plurality of lock bases, realizes a function of synchronously unlocking and locking the plurality of lock bases, so as to improve the unlocking process of the battery and accelerate the battery replacement efficiency.

It would be appreciated by those skilled in the art that various embodiments of the present disclosure have been shown and described in detail, but many other variations or modifications consistent with the principles of the present disclosure may be directly determined or derived based on the present disclosure without departing from the scope of the present disclosure. Therefore, the scope of the present disclosure should be understood and construed to cover all such other variations or modifications.

What is claimed is:

1. A battery pack, wherein a plurality of lock shafts are mounted on an outer side of the battery pack, and each of the lock shafts comprises a shaft seat and a shaft rod; the lock shaft is mounted to the outer side of the battery pack by the shaft seat; a concave positioning hole is arranged at an end of the shaft rod away from the shaft seat, and a first positioning steel magnet is mounted in the positioning hole;
   wherein a retaining ring is provided at a first end of the shaft rod and a retaining flange is provided at a second end of the shaft rod, the first end being the end of the shaft rod away from the shaft seat and the second end being an end of the shaft rod close to the shaft seat; and
   a diameter of the retaining flange is greater than a diameter of the shaft rod, and the retaining ring is snap-fitted in a groove of the shaft rod.

2. The battery pack according to claim 1, wherein the shaft seat has a circular or triangular plate shaped structure.

3. The battery pack according to claim 2, wherein first fixing holes are provided around a center of a circle of the shaft seat, and the shaft seat is mounted to a side edge of the battery pack by the first fixing holes.

4. The battery pack according to claim 3, wherein three or four first fixing holes are symmetrically distributed.

5. The battery pack according to claim 2, wherein the shaft rod is perpendicularly arranged to a surface of the shaft seat, and the shaft rod is perpendicularly connected to a center of a circle of the shaft seat.

6. The battery pack according to claim 1, wherein a sleeve is fitted over the shaft rod to prevent the first positioning steel magnet from coming off, the sleeve is fitted over an outer circumference of an end of the shaft rod to which the first positioning steel magnet is mounted, and the sleeve and the shaft rod are connected in a sliding manner.

7. The battery pack according to claim 5, wherein a connecting end of the shaft rod with the shaft seat passes through a shaft hole in the center of the circle of the shaft seat and is exposed from the other end.

8. The battery pack according to claim 7, wherein a snap ring is arranged at a passing end of the shaft rod to prevent the shaft rod from coming off, and the snap ring is snap-fitted in a groove of the shaft rod.

\* \* \* \* \*